United States Patent [19]

Swingle

[11] 3,918,263
[45] Nov. 11, 1975

[54] HYDROGEN-FUELED INTERNAL-COMBUSTION AND STEAM ENGINE POWER PLANT

[75] Inventor: Benny F. Swingle, Richmond, Va.

[73] Assignee: Environmental Development Corporation, Richmond, Va.

[22] Filed: Mar. 11, 1974

[21] Appl. No.: 450,001

Related U.S. Application Data

[63] Continuation-in-part of Ser. No. 306,436, Nov. 14, 1972, abandoned.

[52] U.S. Cl. .................. 60/614; 60/620; 60/622
[51] Int. Cl.² .................. F01K 27/00; F02G 3/02
[58] Field of Search .............. 123/1 A, 119 E; 60/620–624, 318, 597, 614, 616, 618

[56] References Cited
UNITED STATES PATENTS

| | | | |
|---|---|---|---|
| 1,496,189 | 6/1924 | Waterman | 60/318 |
| 1,632,896 | 6/1927 | Herr | 60/318 |
| 3,572,297 | 3/1971 | Murray | 123/119 E |
| 3,608,660 | 9/1971 | Smith et al | 123/1 A |
| 3,653,364 | 4/1972 | Bogan | 123/119 E |

*Primary Examiner*—Martin P. Schwadron
*Assistant Examiner*—Allen M. Ostrager
*Attorney, Agent, or Firm*—Griffin, Branigan and Butler

[57] ABSTRACT

A power plant is disclosed comprising two internal combustion engines, which are powered by a high-hydrogen-content fuel, and a single steam engine. A steam-engine cylinder is approximately eight times as great in volume as are internal combustion engine cylinders. A coolant jacket surrounds both the internal-combustion engines and the steam engine and an insulating jacket surrounds the coolant jacket. This power plant employs the following method to drive a rotating shaft: The hydrogen-fueled internal-combustion engines produce exhaust gases of high steam content. This steam is fed to the steam engine where it is expanded, thereby causing a reduction of both temperature and pressure. The reduction in temperature allows a heat transfer from the coolant jacket to the steam in the steam engine, and this heat, plus the reduced pressure maintain the steam in a gaseous state. The steam is then condensed. Such condensing produces even higher negative pressures in the steam cylinder for driving a piston. The power plant includes an apparatus for compensating for varying quantities of steam exhaust gases produced by the internal combustion engines with changes in engine load. The compensating apparatus mixes additional steam with the exhaust gases before they are drawn into the steam cylinder, in response to a decrease in the amount of fuel air mixture fed to the internal combustion engines. The compensating apparatus obtains additional steam from the water jacket which surrounds the power plant. Another embodiment of the power plant of this invention comprises two wankel-type internal-combustion engines and a rotary-type steam engine.

18 Claims, 15 Drawing Figures

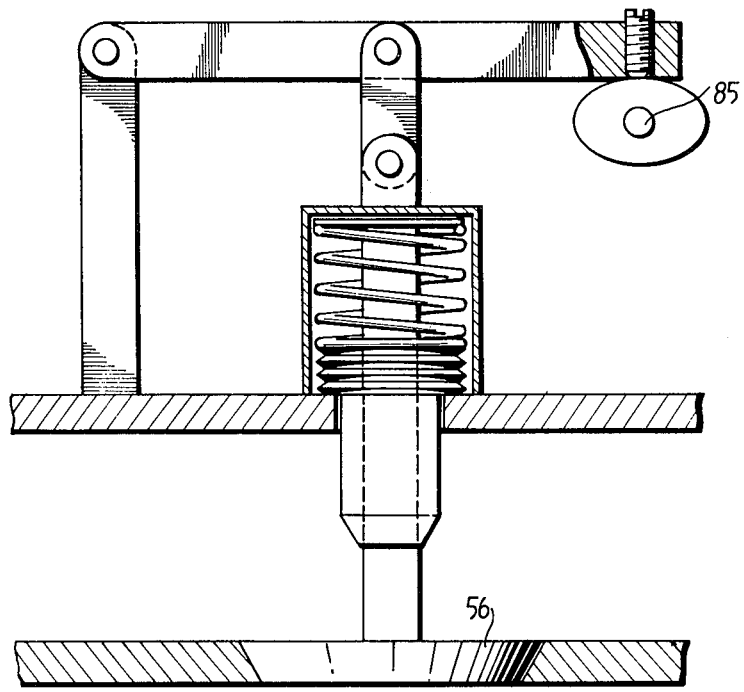
FIG. 9
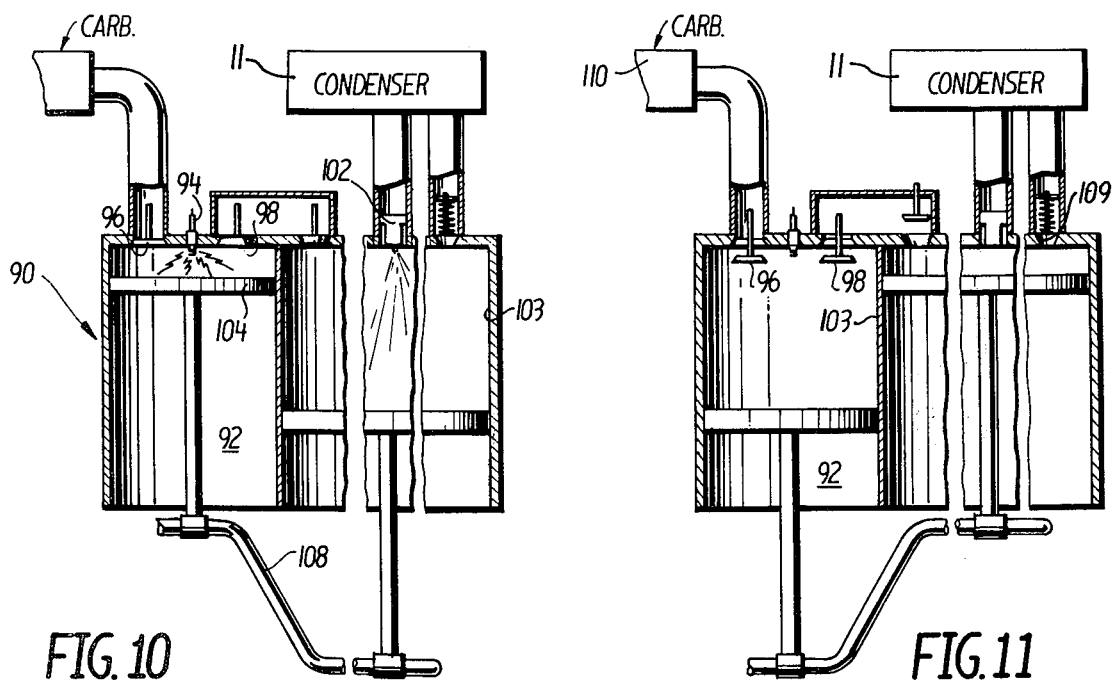
FIG. 10
FIG. 11

HYDROGEN-FUELED INTERNAL-COMBUSTION AND STEAM ENGINE POWER PLANT

This application is a continuation-in-part application of U.S. Patent application serial No. 306,436, filed Nov. 14, 1972 entitled HYDROGEN-FUELED INTERNAL-COMBUSTION and STEAM ENGINE POWER PLANT, abandoned.

BACKGROUND OF INVENTION

This invention relates broadly to the art of combination power plants comprising internal combustion (I.C.) and steam engines. More particularly, the invention concerns such a combination power plant wherein the steam engine is driven by means of condensing steam to cause a negative pressure, thereby allowing atmospheric pressure to drive a movable member.

Many power plants which combine internal-combustion engines and expansion-type steam engines have been devised wherein the internal combustion engines create steam which expands to drive the expansion-type steam engines. The following United States patents describe such power plants: Schaffers (U.S. Pat. No. 965,213), Wright (U.S. Pat. No. 1,006,167), Stocks (U.S. Pat. No. 1,011,520), Costa (U.S. Pat. No. 1,433,185), Terrenoud (U.S. Pat. No. 1,802,828), Wuehr (U.S. Pat. No. 2,217,192), Denker (U.S. Pat. No. 2,791,881), Foster (U.S. Pat. No. 3,143,850), Campbell (U.S. Pat. No. 2,202,840), Petrie (U.S. Pat. No. 3,267,661) and Straub (U.S. Pat. No. 3,426,524).

A difficulty with the devices described in most of these patents is that there is insufficient heat generated by the internal combustion engines to vaporize a sufficient amount of water for driving the expansion-type steam engines. In most of these devices, water is injected into hot exhaust gases of the internal combustion engines to vaporize this water and create expanding steam for driving the steam engines. However, what often takes place is that when water is injected into the hot exhaust gases there is contraction of the exhaust gases and an insufficient amount of steam is created to offset the effects of this contraction. Such contraction can actually cause a negative pressure rather than a positive pressure as is required to drive a piston by expanding steam. Thus, it is an object of this invention to provide an internal-combustion/steam combination power plant wherein the steam engine thereof is not primarily driven by expanding steam.

At least two prior-art U.S. patents, U.S. Pat. No. 878,925 to Woolf and U.S. Pat. No. 1,006,167 to Wright describe combination power plants wherein expanding steam (which is created by use of internal-combustion engine heat) is used to drive pistons in first directions and the steam is then condensed to create negative pressures and drive the pistons in opposite directions. Thus, these devices take advantage of the contraction phenomenon described in the previous paragraph. However, in Woolf the expanding steam is again created by injecting water into hot gases from an internal combustion engine and therefore the problem of contraction during an expansion stroke still exists. Also, it appears that these devices create insufficient amounts of steam to properly drive the "negative-pressure" or "vacuum" strokes because there is insufficient heat given off by the internal combustion engine. Further, in these devices, back pressures are created at the exhausts of the internal combustion engines which reduce their efficiencies. It is therefore another object of this invention to provide an internal combustion/steam combination power plant which creates sufficient steam to run the steam engine portion thereof but yet which does not rely on injecting water into the exhaust gases of an internal combustion engine for the production of this steam and which is efficient in operation.

It is well known that internal combustion engines are relatively inefficient, with approximately 75% of their generated heat being ejected with exhaust gases or dissipated by cooling systems. It is yet another object of this invention to provide a power plant which gets useful work from a larger portion of the waste heat energy of an internal combustion engine than previous plants.

In recent years emphasis has been placed on creating pollution-free internal combustion engines and toward this end U.S. Pat. No. 3,572,297 to Murray and U.S. Pat. Nos. 3,608,529 and 3,608,660 to Smith disclose hydrogen-fueled internal combustion engines. However, none of these apparatus uses the steam exhaust created by these hydrogen-fueled internal combustion engines to drive steam engines. It is therefore another object of this invention to provide a method and apparatus for employing the steam created by hydrogen-fueled internal combustion engine to drive steam engines.

SUMMARY OF THE INVENTION

According to principles of this invention a hydrogen-fueled internal combustion engine is combined with an "inverse-acting" or "negative pressure" steam engine having a cylinder which is approximately eight times as large in size as the internal combustion engine cylinder. A coolant jacket surrounds both the internal combustion engine and the steam engine and an insulating jacket surrounds the coolant jacket. The hydrogen-fueled engine produces naturally high-steam-content exhaust gas. This exhaust gas is transferred to the steam engine where it is expanded, thereby causing a reduction of both temperature and pressure. The reduction of temperature allows a heat transfer from the coolant jacket to the steam in the steam engine, and this heat, plus the reduced pressure, maintains the steam in a gaseous state. The steam is then condensed, thereby creating negative pressures in the steam engine and allowing atmospheric pressure to drive a movable member of the steam engine. The principles of this invention can be used for piston-type power plants as well as rotary (e.g., wankel) power plants.

BRIEF DESCRIPTION OF THE DRAWINGS

The foregoing and other objects, features, and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

FIG. 9 is a partially cutaway side view of a modified mechanism for driving a steam-cylinder exhaust valve;

FIGS. 10 and 11 are simplified cutaway side views of a piston-type power plant wherein the internal combustion engine thereof is a two-cycle engine, the views being taken at different time intervals in an operational cycle; and, FIGS. 12–15 are schematic views of a rotary (wankel) type power plant which employs principles of this invention at various time intervals in an operational cycle.

DESCRIPTION OF THE PREFERRED EMBODIMENT

Figure 1:
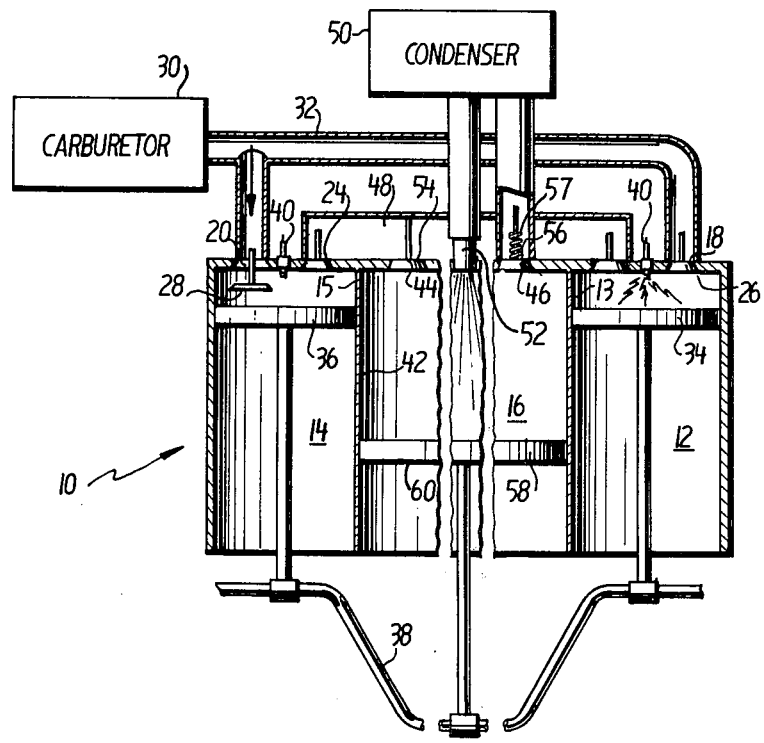
FIGS. 1–4 are simplified cutaway side views of a piston-type power plant employing principles of this invention at various time intervals in an operational cycle wherein the internal combustion engine thereof is a four-cycle engine and wherein the size of the steam engine is reduced by inclusion of break lines.

Referring now to FIGS. 1–5, a power plant 10 comprises right and left internal combustion engines 12 and 14 and a steam engine 16.

The right and left internal combustion (I.C.) engines 12 and 14 respectively define I.C. cylinder chambers 13 and 15 which respectively have fuel inlet openings 18 and 20 and exhaust-gas outlet openings 22 and 24. Fuel flow through the fuel inlet openings 18 and 20 is controlled by means of fuel-inlet valves 26 and 28. A high-hydrogen content fuel is fed from a carburetor 30 in response to depression of an accelerator pedal 31 (FIG. 5) through an intake manifold 22 to the fuel inlet openings 18 and 20. Some examples of suitable high hydrogen content fuels for use in this invention are propane, butane, methane, natural gas and pure hydrogen.

Positioned inside the I.C. cylinder chambers 13 and 15 respectively are I.C. pistons 34 and 36 which are rotatably attached to a crankshaft 38. Right and left sparkplugs 40 are mounted at the upper ends of the I.C. cylinder chambers 13 and 15.

The steam engine 16 defines a steam cylinder chamber 42 which is between 6 and 10 times greater in volume than either of the I.C. cylinder chambers 13 and 15, and in the preferred embodiment is approximately eight times as great. It is presently thought that if the steam cylinder chamber's volume were less than six times as great as that of the I.C. cylinder chamber there would not be a sufficient reduction in steam temperature to obtain a meaningful transfer of heat to the steam as explained below. The steam cylinder chamber 92 has a steam intake opening 44 and an exhaust opening 46. The steam intake opening 44 is connected by means of a steam transfer manifold 48 to the exhaust gas outlet openings 22 and 24. The steam exhaust opening 46 is connected to a condenser 50 and the condenser 50 is, in turn, connected to a water-injection system 52, which communicates with the inside of the steam cylinder chamber used to inject water directly into the steam cylinder. The water injection system responds to depression of the accelerator pedal 31 (FIG. 5) by injecting more water into the steam of cylinder chamber 42. A steam-in valve 54 controls steam flow through the steam intake opening 44 and an exhaust valve 56 controls exhaust flow through the exhaust opening 46.

Figure 6:
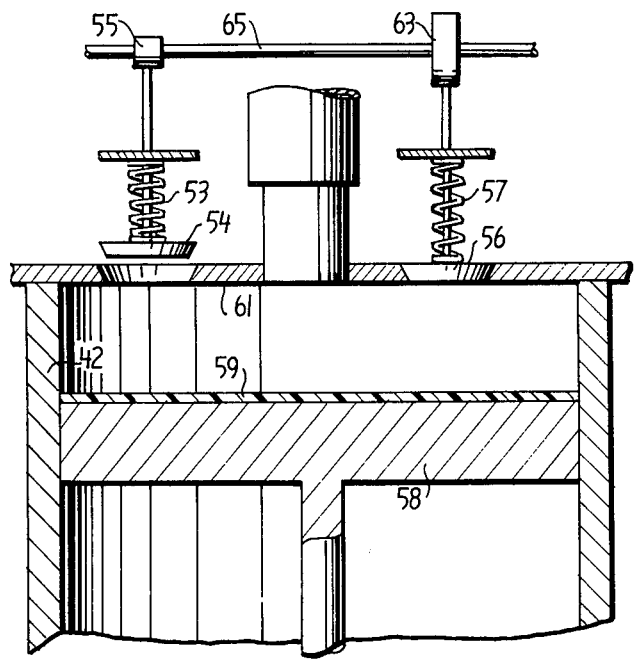
FIG. 6 is a diagrammatic side view of the stem cylinder chamber of the apparatus of FIGS. 1–5.
Figure 8:
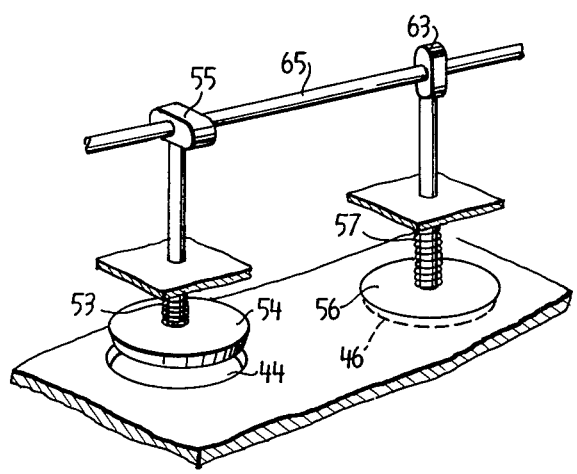
FIG. 8 is an isometric view showing the camshaft of FIG. 6 driving steam cylinder chamber valves.

With reference to FIGS. 6 and 8 (FIG. 8 being an isometric which is arranged to show cam lobes) a spring 54 biases the steam-in valve 54 toward an open position and a spring 57 biases the exhaust valve 56 toward a closed position. The cam lobe 55, mounted on a cam shaft 65, operates on the steam-in valve 54 to positively close this valve; while the spring 53 opens this valve when it is released by the cam lobe 55. The cam lobe 63 operates on the exhaust valve 56 to hold this valve in a closed position; and the spring 57 also acts to hold this valve in a closed position.

It should be noted that the cam lobes 55 and 63 each have two faces. Two faces are necessary because the steam engine 16 is a two cycle engine, whereas I.C. engines 12 and 14 are four cycle engines.

The steam cylinder chamber 42 is much larger (6 to 10 times) than the I.C. cylinder chambers 13 and 15 so that exhaust gases can be transferred from the I.C. cylinder chambers to the steam cylinder chamber at a below atmospheric pressure. In the preferred embodiment the diameter of the steam cylinder chamber 42 is about eight times as great as that of the I.C. cylinder chambers 13 and 15, with this size difference being apparent from FIG. 7.

A steam piston 58 is positioned inside the steam cylinder chamber 42 and is rotatably connected to the crankshaft 38.

The fuel-inlet and exhaust-outlet valves of the internal combustion engines 12 and 14, as well as the water injection system 52 of the steam engine 16 are also operated by the camshaft 65, although this is not shown in the drawings.

Figure 3:
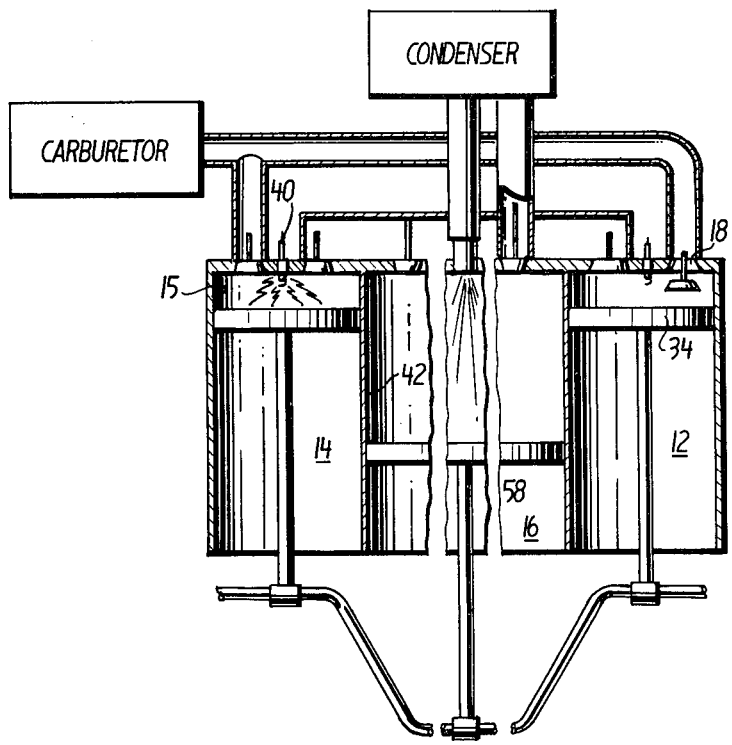
Figure 4:
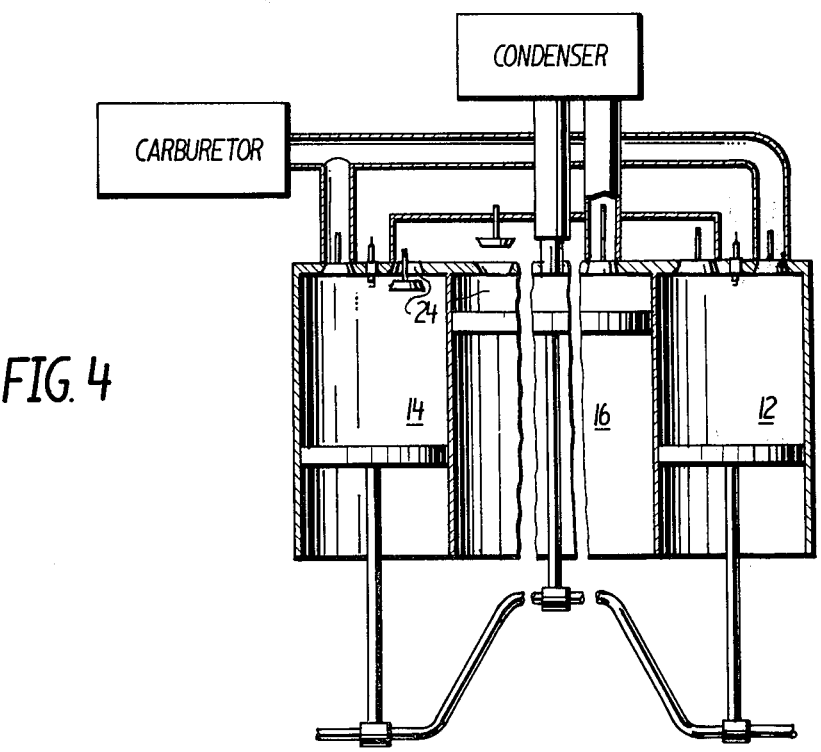
Figure 5:
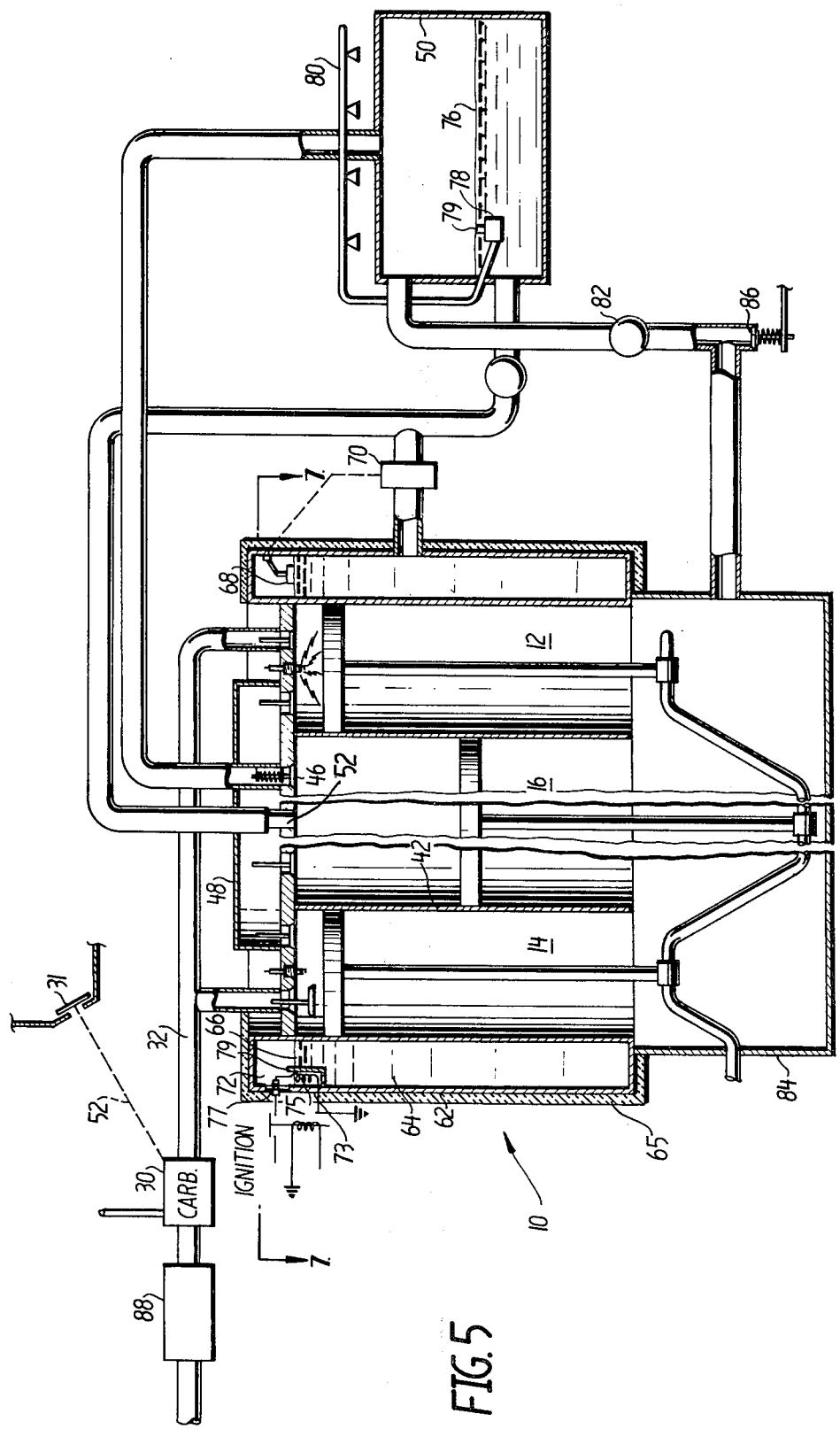
FIG. 5 is a more detailed cutaway side view of the apparatus of FIGS. 1–4.
Figure 7:
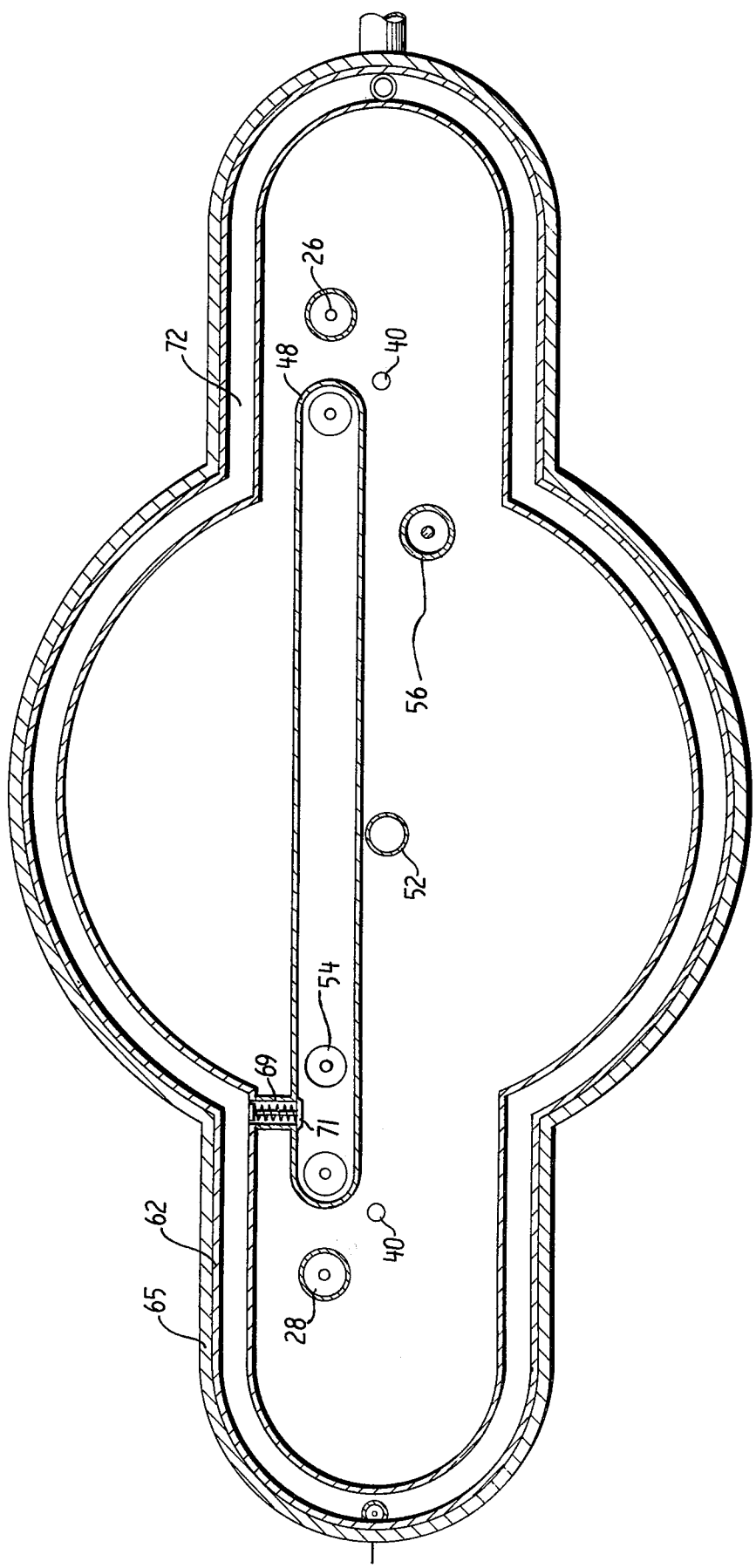
FIG. 7 is a sectional view taken on line 7—7 of FIG. 5.

FIGS. 5 and 7 show the apparatus of FIGS. 1–4 in more detail and depict various refinements to the basic apparatus of FIGS. 1–4.

It can be seen in FIG. 5 that the power plant 10 is surrounded by a water jacket 62 which is, in turn, surrounded by an insulating jacket 65. Water 64 is maintained at a fixed level 66 by means of a float 68 which controls a water-in valve 70. The water 64 absorbs heat from the internal combustion engines 12 and 14 and steam develops in a small open space 72 about the water level 66. In FIG. 7 it can be seen that the open space 72 communicates with the steam transfer manifold 48 by means of a passage 69 and a spring-biased, normally-closed valve 71.

The purpose of the valve 71 is to compensate for varying amounts of steam which are produced by the internal combustion engines 12 and 14 for filling the fixed-volume steam cylinder chamber 42. In this regard, at high power engine outputs the right and left I.C. engines 12 and 14 produce a sufficiently large amount of steam to produce desirable pressure in the steam cylinder chamber 42; but at lower power outputs there is not sufficient steam produced for the steam cylinder chamber 42. When this happens a sufficiently high negative pressure is produced inside the steam transfer manifold 48 and the spring-biased valve 71 opens to relieve this high negative pressure. In an unillustrated embodiment a variable bias is provided for the valve 71 which is driven by the cam shaft to increase the negative pressure required to operate the valve 71 at bottom-dead-center of the steam piston. When the power plant 10 is first started, and the water 64 is relatively cool, there is little, or no, steam available inside the open space 72. Thus, an electric flash heater 73, having a heating element 75, which is responsive to a pressure switch 77, is provided to create steam relatively quickly because it must only heat that water which enters an insulated enclosure 79 through a small opening in the bottom of the enclosure 79. After the power plant 10 has been running for a time the pressure switch 77 cuts off the flash heater 73.

The water 64 has the additional purpose of transferring heat from the I.C. engines 12 and 14 to the steam cylinder chamber 42, as will be described below.

It can be seen in FIG. 5 that steam and water passing through the exhaust opening 46 enter the condenser 50. Any steam which remains in the exhaust is condensed by the condenser 50 and forms as water 76 at the bottom of the condenser 50. Surplus water enters a pipe 79 and is pumped by means of a pump 78 into a water spray nozzle 80. The nozzle 80 sprays this water onto the outside of the condenser 50, where it evaporates and thereby removes heat from the condenser 50. A water supply pump 81 furnishes a continuous pressurized supply of water to the water-in valve 70 and to the water injection system 52. A vacuum pump 82 continuously pumps gases out of the condenser 50 and presses these gases toward a crankcase 84. The atmosphere in the crankcase 84 is maintained at a desirably high fixed pressure by means of a spring-biased relief valve 86 which opens automatically at the desired pressure. The reason for pressurizing the crankcase 84 is to balance the effects of a super charger 88 which is used to increase the pressure of the fuel/air mixture entering the I.C. cylinder chambers 13 and 15. The purpose of the super charger 88 is to aid in pressing a sufficient amount of fuel into the I.C. engines 12 and 14 for providing sufficient steam to drive the steam engine 16; however, these features are embellishments and not essential to the overall operation of the invention.

Explaining now the overall sequence of operation of the power plant of FIGS. 1–8, generally, the hydrogen fuel which drives the right and left I.C. engines 12 and 14 creates primarily steam exhaust gases which are transferred to the steam engine 16. In the steam engine 16, the exhaust steam is expanded so that it absorbs heat from the heated water 64 (FIG. 5) in the water jacket 62. The steam is then condensed to cause a vacuum power stroke.

With particular reference to FIGS. 1–4, FIG. 1 depicts the power plant at the beginning of a cycle. In this position the right I.C. engine 12 is beginning a power stroke, the left I.C. engine 14 is beginning an intake stroke and the steam engine 16 is beginning a "vacuum (power) stroke".

With reference to the right I.C. engine 12, the carburetor 30 has just fed a high-hydrogen content fuel air mixture through the fuel inlet opening 18 and the fuel inlet valve 26 has closed. The right sparkplug 40 is firing in FIG. 1, as indicated by jagged lines, thereby causing ignition of the high-hydrogen content fuel/air mixture in the I.C. cylinder chamber 13.

With reference to the steam engine 16, the steam cylinder chamber 42 is full of steam at a pressure of approximately 8 P.S.I.A. (absolute) and at a temperature of approximately 150°F. When it first began to receive this steam from the left I.C. engine 14 through the steam intake opening 44 the steam was at a pressure of 15 P.S.I.A. and a temperature of 2,300°F; however, the steam cylinder chamber 16, being eight times as great in volume as the left I.C. engine cylinder chamber 15, expanded the steam in the transfer so that its temperature was reduced to approximately 150°F. The steam remained in a gaseous state however, due to the reduced pressure and by absorbing heat from the water jacket 62. In this regard, the water in the water jacket 62 is maintained at a temperature of approximately 350°F. This water receives heat from combustions in the I.C. engines. It should also be mentioned that engine oil temperature is also maintained at 350°F and heat is transferred from this to the steam in the steam cylinder through the piston head.

The cam shaft 65 (FIGS. 6 and 8) is positioned such that the steam-in valve 54 is now being held closed by the cam lobe 55 but the exhaust valve 56 is allowed to open. However, the exhaust valve 56 is being held closed by the spring 57. Water is being injected by the water-injection system 52 into the steam cylinder chamber 42 which causes condensation of steam thereby creating a negative pressure in the steam cylinder chamber 42. Thus, atmospheric pressure operates on a surface 60 of the steam piston 58 to drive it upwardly.

The left I.C. engine 14 is just beginning its induction stroke. That is, the fuel inlet valve 28 is open so that a high-hydrogen content fuel/air mixture can enter the cylinder chamber through the fuel inlet opening 20 and, as the I.C. piston 36 is pulled downwardly by the crankshaft 38, the hydrogen fuel is drawn into this chamber.

Figure 2:
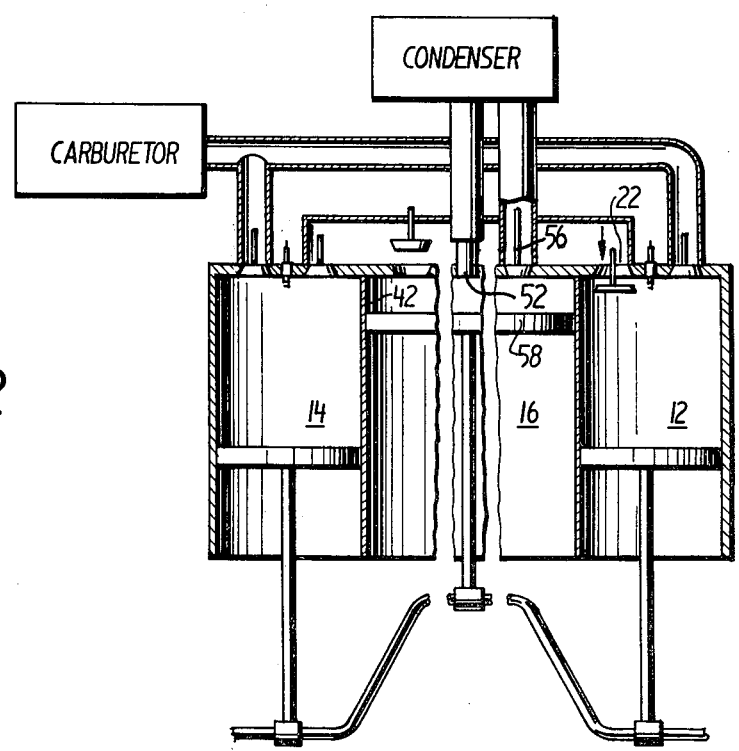

Turning now to FIG. 2 (one quarter of a cycle later), the right I.C. engine 12 is now beginning its exhaust stroke, the steam engine 16 has just ended its vacuum (power) stroke and is beginning its induction stroke and the left I.C. engine 14 is beginning its compression stroke.

Although not shown in FIG. 2, the steam engine exhaust valve 56 was forced open (against the bias of spring 57, FIGS. 6 and 8) by condensed water and residual gases in the steam cylinder chamber 42 when the steam piston 58 approached the top 61 of the steam cylinder chamber 42 at the end of the vacuum stroke. In this regard, with reference to FIG. 6, the steam piston 58 has a layer 59 of a relatively soft plastic, such as Teflon, on the top surface thereof to allow contact between the top surface of the piston and the top 61 of the steam cylinder 42. Once the water and exhaust gases were forced past the exhaust valve 56, the exhaust valve 56 was closed automatically by spring 57, and was thereafter held closed by the cam lobe 63 as shown in FIG. 6. The cam lobe 63 will continue to hold this valve closed through the induction stroke. Eventually the water and exhaust gases flow into the condenser 50. It can also be seen in FIg. 2 that exhaust steam from the right I.C. engine 12 will be transferred through the exhaust gas outlet opening 22 and the steam intake opening 44 to the steam cylinder chamber 42.

Referring now to FIG. 3, (one half of a cycle) the right I.C. engine 12 is beginning its induction stroke, the steam engine 16 is beginning a power stroke. The I.C. piston 34, as it moves downwardly, draws high hydrogen content fuel from the carburetor 30 through the fuel inlet opening 18. Water is being injected into the steam cylinder chamber 42 by means of the injection system 52, thereby condensing steam in the steam cylinder chamber 42 and creating a negative pressure inside the steam cylinder chamber 42 which allows atmospheric pressure to drive the steam piston 58 upwardly. The left sparkplug 40 is firing thereby igniting the hydrogen fuel in the left I.C. engine cylinder chamber 15.

In FIG. 4, (three quarters of a cycle) the right internal combustion engine 12 is beginning a compression stroke, the steam engine 16 has completed a second vacuum (power) stroke and is beginning a second induction stroke, and the left I.C. engine 14 is beginning an exhaust stroke. In this regard, steam, which forms the exhaust gases of the left I.C. engine 14, will be transferred through the exhaust gas outlet opening 24 and the steam intake opening 44 to the steam cylinder chamber 42.

One quarter of a cycle later we return to the beginning of the cycle at FIG. 1 and the cycle is repeated.

It should be noted that the steam piston 58, while withdrawing, pulls a partial vacuum in the steam cylinder chamber 42 and in an exhausting I.C. cylinder chamber due to the relatively large size of the steam cylinder chamber 42. The amount of vacuum is controlled somewhat by the valve 71 (FIG. 7) which, as mentioned above, may have a variable bias controlled by the cam shaft. In any event the work required to pull this partial vacuum is substantially recovered during the vacuum (power) stroke of the steam engine. Further, by positively drawing the exhaust gases out of the I.C. engine, the I.C. engine's efficiency is increased.

An interesting feature of this invention is that it operates similarly as did a steam engine built by Thomas Newcomen of England in 1712. That is, it employs a vacuum stroke without a pressure stroke as do most modern steam engines. It should be understood that such a system is enhanced by the use of hydrogen fuel which creates steam as exhaust gases. Also it should be understood that this system is superior to combination power plants wherein expanding steam is used to drive pistons because it does not require an undue amount of heat for converting water to steam.

Further, this system uses exhaust gases which are naturally generated by an internal combustion engine for performing work, thereby increasing its efficiency over those of internal combustion engines which simply discard exhaust gases.

FIG. 9 depicts another method of controlling the steam engine exhaust valve 56, wherein a cam shaft 85, which drives all of the other intake and exhaust valves of the power plant 10, as well as the water injection system 52, positively lifts the valve 56 at appropriate time intervals. In this embodiment the valve 56 is held closed by a spring.

It will be appreciated by those skilled in the art that it is possible to open the exhaust valve 56 when the steam piston 58 is at the bottom of its stroke (as shown in FIG. 1) and then perform all of the steam condensing in the condenser 50 to power a vacuum stroke rather than condensing by injecting water into the steam cylinder chamber 42. And, in fact, such a procedure is employed in another embodiment of this invention although not depicted herein.

FIGS. 10 and 11 depict a power plant 90 which is similar to the power plant 10 of FIGS. 1–5; however, in this embodiment a single internal combustion engine 92 is a two cycle engine rather than a four cycle engine.

In FIG. 10 the internal combustion engine 92 is beginning a power stroke. Its sparkplug 94 is firing, and its intake and exhaust valves 96 and 98 are both closed. A steam engine 100 is beginning its vacuum, or power, stroke. An injection system 102 is injecting water into steam inside a cylinder chamber 103 of the steam engine 100 to condense steam therein. Thus, both an I.C. piston 104 and a steam piston 106 drive a crankshaft 108 on this stroke.

In FIG. 11 (one half of a cycle later), the I.C. engine 92 is in its induction and exhaust mode in that the intake valve 96 and the exhaust valve 98 are open and the steam engine 100 is in its induction mode. The steam piston has just finished forcing condensed water and gases through a normally closed, spring-biased valve 109, toward a condenser 111. A high-hydrogen content fuel is entering the cylinder chamber of the I.C. engine 92 from a carburetor 110 and exhaust steam is being transferred from the cylinder chamber of the I.C. engine 92 to the cylinder chamber 103 of the steam engine 100.

A similar steam cylinder/I.C. cylinder volumn ratio exists for the two-cycle I.C. engine of FIGS. 10 and 11 as for the four-cycle system of FIGS. 1–5. Also a water jacket is similarly employed, although not depicted in the drawings.

Thus, essentially the same method that was used to drive the power plant of FIGS. 1–5 is also used to drive the power plant of FIGS. 10 and 11. That is, an internal combustion engine is driven on a high hydrogen content fuel and steam exhaust from the internal combustion engine is expanded and used to produce a vacuum (power) stroke in a steam engine.

Turning now to FIGS. 12–15, there is depicted therein a wankel-type rotary power plant 112 which operates in a manner similar to the manner in which the piston-type power plant of FIGS. 1–4 operates.

The wankel-type rotary power plant 112 comprises right and left internal combustion engines 113 and 114 and a steam engine 115.

The I.C. engines 113 and 114 respectively include I.C. rotary pistons 116 and 117, I.C. chambers 120 and 121 and spark plugs 122 and 123.

The steam engine 115 includes a steam rotary piston 124, a steam chamber 128 which is approximately eight times as large as the I.C. chambers 120 and 121, although it does not appear to be so in the drawings. The steam engine also includes first and second water injection systems 130 and 131.

Also included in the wankel-type rotary power plant 112 is a water jacket enclosing the I.C. and steam engine (indicated by a box 127) and an insulative jacket enclosing the water jacket (indicated by a box 129). The water jacket 127 and the insulative jacket 129 have the same functions as the water and insulative jackets 62 and 65 of FIG. 5.

The I.C. chambers 120 and 121 have intake ports 132 and 133 interconnected with a carburetor 134 which furnishes a high-hydrogen-content fuel. The I.C. chambers 120 and 121 have exhaust ports 136 and 138 which are respectively interconnected with steam intake ports 140 and 142 of the steam engine 115. And the steam engine 115 has exhaust ports 144 and 146 which are interconnected with a condenser 148.

The I.C. intake ports 132 and 133 and the steam intake ports 140 and 142 are respectively located at the end walls of the I.C. chambers 120 and 121 and the steam chamber 128. End seal strips 149 are on the end faces of the rotary pistons 116, 117 and 124 which make contact with end walls of the chambers 120, 121 and 128. The intake ports 132, 133, 142 and 140 are positioned such that there is little or no respective overlapping between intake and exhaust portions of cycles.

It should be understood that the rotors 116, 117 and 124 have internal teeth which respectively mesh with external teeth of a single shaft 150, for driving the shaft. In this regard, FIGS. 12–15 depict a schematic view wherein the various engines are shown in phase, positionally, side-by-side, whereas, in fact, they are lined up along the single shaft 150 and are not necessarily in phase positionally. Further structures of the engines 113–115 are similar to normal wankel-type rotary engines and therefore are not explained in detail herein.

To aid in explaining the operation of the rotary power plant 112 the complementary faces of the rotors 117, 124 and 116 have respectively been labeled with a, b, and c; a', b' and c'; and a'', b'' and c''.

Explaining the operation of the rotary power plant 112, generally, the hydrogen fuel which drives the right and left I.C. engines 113 and 114 creates primarily steam exhaust gases which are transferred to the steam engine 115. In the steam engine 115, the exhaust steam is expanded so that it absorbs heat from the heated water in the water jacket 127. The steam is then condensed to cause vacuum power strokes.

Figure 12:
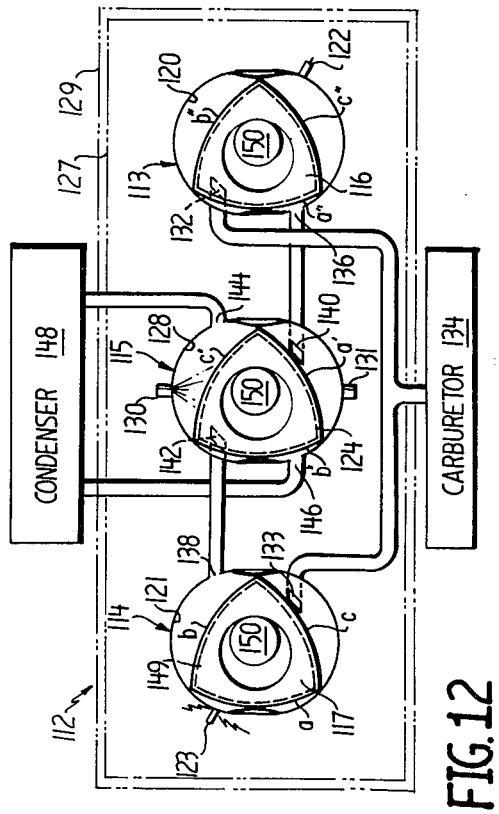
Figure 14:
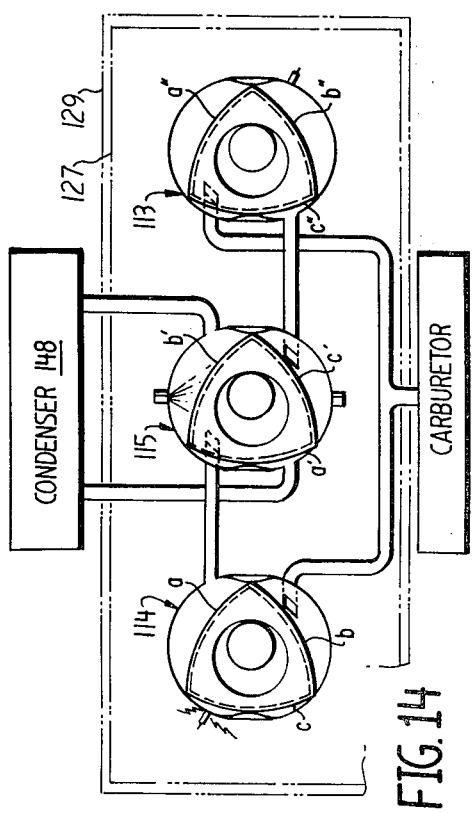

More particularly, in FIG. 12 (beginning of cycle) the spark plug 123 of I.C. engine 114 is firing to ignite high-hydrogen fuel so that face a is beginning a power stroke. Face b is simultaneously beginning to exhaust steam through the exhaust port 138 and face c is about to begin a compression stroke after receiving a hydrogen fuel/air mixture from the carburetor 134.

Face b' of the steam engine 115 is completing a vacuum power stroke by pressing condensed water through an exhaust port 146 to the condenser 148 and is about to begin an induction stroke by drawing steam from the left I.C. engine 114 through the steam intake port 142. Since the steam chamber 128 is eight times as large as the I.C. chambers, such induction produces a decrease in the pressure of and a lowering of the temperature of the steam. The temperature is reduced below the temperature of water in the water jacket and the steam absorbs heat from the water. Face c' is in the midst of a vacuum power stroke inasmuch as the water injection system 130 is injecting water into the steam chamber 128 to condense steam trapped by the face c'. It is noted that this trapped steam already has access to the condenser 148 through the exhaust port 144, and in some cases it is not necessary to inject water into the steam cylinder 128. Face a' is just completing an induction stroke wherein it is receiving exhaust steam from the I.C. engine 113.

With regard to the right I.C. engine 113, face a'' is completing an exhaust stroke and about to begin an induction stroke, face b'' is beginning a compression stroke and face c'' is completing a power stroke.

Figure 13:
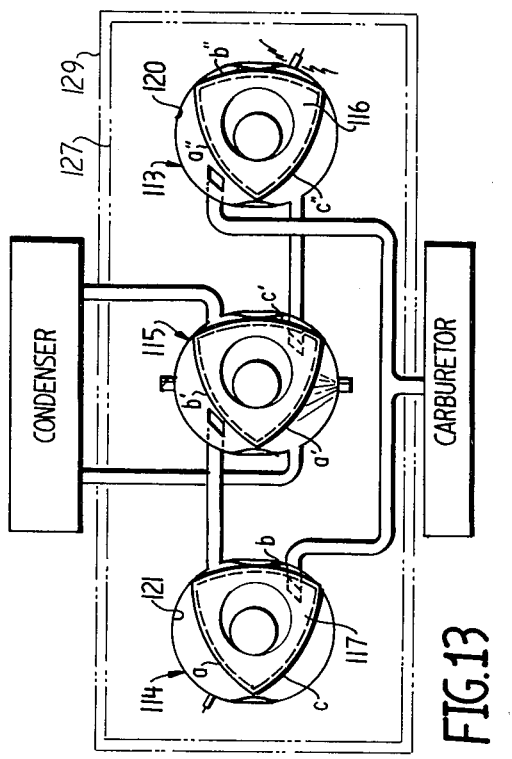
Figure 15:
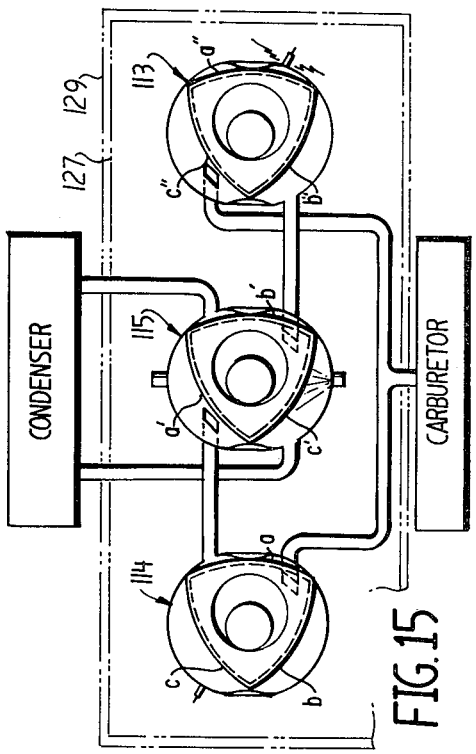

Outlining now the positions of the respective faces of the rotor pistons of FIGS. 12–15:

FIG. 13 (one sixth of a cycle)
 I.C. Engine 114
  Face a — completing power stroke
  Face b — completing exhaust stroke
  Face c — completing compression stroke
 Steam Engine 115
  Face a' — during vacuum stroke
  Face b' — completing induction stroke
  Face c' — completing vacuum stroke
 I.C. Engine 113
  Face a'' — completing induction stroke
  Face b'' — beginning power stroke
  Face c'' — beginning exhaust stroke
FIG. 14 (two sixths of a cycle)
 I.C. Engine 114
  Face a — beginning exhaust stroke
  Face b — completing induction stroke
  Face c — beginning power stroke
 Steam Engine 115
  Face a' — completing vacuum stroke
  Face b' — during vacuum stroke
  Face c' — completing induction stroke
 I.C. Engine 113
  Face a'' — beginning a compression stroke
  Face b'' — completing a power stroke
  Face c'' — completing an exhaust stroke
FIG. 15 (three sixths of a cycle)
 I.C. Engine 114
  Face a — completing an exhaust stroke
  Face b — beginning a compression stroke
  Face c — completing a power stroke
 Steam Engine 115
  Face a' — completing an induction stroke
  Face b' — completing a vacuum stroke
  Face c' — during a vacuum stroke
 I.C. Engine 113
  Face a'' — beginning a power stroke
  Face b'' — beginning an exhaust stroke
  Face c'' — completing an induction stroke It should be noted that in the various embodiments of this invention, heat, which is normally thrown off as waste in conventional internal combustion engines, is utilized to maintain water as steam at reduced pressure until it is condensed. Also, the heat in the exhaust gases themselves is used to maintain the water as steam until it is condensed. Still further, the steam engine in each embodiment draws a partial vacuum on the exhausts of the I.C. engines which improves I.C. engine scavenging. All of these factors combine to provide increased efficiency of the power plants of this invention over those of conventional I.C. engines.

While the invention has been particularly shown and described with reference to preferred embodiments, it will be understood by those skilled in the art that various changes in form and detail may be made therein without departing from the spirit and scope of the invention. For example, during the vacuum/power stroke of the steam engine 16 (FIGS. 1–4), all, or part of, the steam condensing could take place in the condenser 50 rather than in the cylinder chamber 42, as described above. Further, spring loaded valves, similar to valve 56 of the FIGS. 1–5 embodiment, could be mounted in the steam engine exhaust ports 144 and 146 of the FIGS. 12–15 embodiment. Further, a multiple stage vacuum steam engine could be employed rather than a single stage, as is depicted and described herein.

I claim:
1. A method of driving a working member comprising the steps of:
 igniting a fuel of high hydrogen content in an internal combustion chamber thereby producing a large amount of steam which expands said internal combustion chamber to drive said working member;
 transferring said steam to a steam chamber and therein expanding the volume of said chamber a sufficient amount to reduce the steam pressure therein to a negative pressure and thereby reduce its temperature;
 transferring waste heat from said internal combustion engine to said steam in said steam chamber;
 thereafter condensing said transferred steam thereby producing a still greater negative pressure in said steam chamber whereby atmospheric pressure con- tracts said steam chamber to drive said working member.

2. A method as claimed in claim 1 wherein said transferred steam is condensed in said steam chamber by means of injecting water into said chamber.

3. A method as claimed in claim 2 wherein said steam chamber includes a separate condenser.

4. A method as claimed in claim 1 wherein is included the additional step of inserting additional steam into said steam as it is transferred from said internal combustion chamber to said steam chamber.

5. A method as claimed in claim 4 wherein said additional steam is obtained by heating water with waste heat generated by the ignition of said fuel in said internal combustion chamber and wherein said heated water surrounds said internal combustion chamber and said steam chamber for transferring said heat from said internal combustion engine to said steam in said steam chamber.

6. A power plant comprising:
a driven member;
an internal combustion engine, said internal combustion engine including:
    a member for defining a combustion chamber having a fuel inlet opening and an exhaust-steam outlet opening;
    a carburetor means for feeding a high-hydrogen-content fuel to said fuel inlet;
    an igniting means for igniting said high-hydrogen-content fuel and therey causing combustion of said fuel inside said combustion chamber; and
a steam engine, said steam engine including:
    a member for defining a steam chamber having a steam inlet opening and an exhaust outlet opening wherein said steam inlet opening is interconnected with said combustion-chamber exhaust-steam outlet opening so that steam leaving said combustion chamber through said exhaust-steam outlet opening enters said steam chamber through said steam inlet opening, said steam chamber having a volume which is from six to 10 times greater than the volume of said combustion chamber;
    a condenser means for condensing said steam which enters said steam chamber through said steam inlet opening, thereby causing a negative pressure inside said steam chamber;
    a movable member positioned inside said steam chamber, which is attached to said drive member, and which is motivated by a pressure differential between said negative pressure and a pressure related to atmospheric pressure, to drive said driven member;
    a heat-transfer means for transferring waste heat from said combustion chamber to said steam in said steam chamber.

7. A power plant as claimed in claim 6 wherein said internal combustion engine and said steam engine are piston-type engines.

8. A power plant as claimed in claim 7 wherein there are two piston-type internal combustion engines, each of said engines being a four cycle engine.

9. A power plant as claimed in claim 7 wherein is further included means for mixing additional steam with said exhaust steam which is transferred from said combustion chamber to said steam chamber, with the amount of said additional steam being dependent upon the load which said power plant motivates.

10. A power plant as claimed in claim 9 wherein:
is further included:
    a water tank for absorbing waste heat generated by said internal combustion engine and thereby producing steam and said additional steam is obtained from said water tank; and
wherein said water tank forms said heat transfer means by surrounding said combustion and steam chambers.

11. A power plant as claimed in claim 10 wherein is further included an electric flash heater in said water tank for aiding in creating said additional steam.

12. A power plant as claimed in claim 7 wherein said condensing means includes a means for injecting water into said steam chamber for condensing steam in said steam chamber.

13. A power plant as claimed in claim 7 wherein said steam chamber includes a piston cylinder portion and a condenser portion which is separate from said piston cylinder portion but which is in communication with said piston cylinder.

14. A power plant as claimed in claim 13 wherein said condenser means includes a means for injecting water into said piston cylinder portion for condensing steam in said piston cylinder portion.

15. A power plant as claimed in claim 7 wherein there is one piston-type internal combustion engine, said engine being a two cycle engine.

16. A power plant as claimed in claim 6 wherein said internal combustion and said steam engines are rotary-type engines.

17. A power plant as claimed in claim 16 wherein there are two rotary-type internal combustion engines, and one rotary-type steam engine.

18. A power plant as claimed in claim 17 wherein said rotary-type steam engine defines a working chamber having first and second intake ports with said first intake port communicating with an exhaust port of said first rotary-type internal combustion engine and said second intake port communicating with an exhaust port of said second rotary-type internal combustion engine.

* * * * *